(12) United States Patent
Zhou et al.

(10) Patent No.: US 7,758,660 B2
(45) Date of Patent: Jul. 20, 2010

(54) CRYSTALLINE NANOCATALYSTS FOR IMPROVING COMBUSTION PROPERTIES OF FUELS AND FUEL COMPOSITIONS INCORPORATING SUCH CATALYSTS

(75) Inventors: Bing Zhou, Cranbury, NJ (US); Zhihua Wu, Lawrenceville, NJ (US); Martin Fransson, Princeton, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 859 days.

(21) Appl. No.: 11/351,661

(22) Filed: Feb. 9, 2006

(65) Prior Publication Data

US 2007/0180760 A1 Aug. 9, 2007

(51) Int. Cl.
*B01D 9/00* (2006.01)
(52) U.S. Cl. .......................................... 44/354; 502/74
(58) Field of Classification Search .................. 44/354; 502/74
See application file for complete search history.

(56) References Cited

U.S. PATENT DOCUMENTS

| | | | |
|---|---|---|---|
| 3,839,225 A | 10/1974 | Acres | 252/432 |
| 3,864,451 A | 2/1975 | Lee et al. | 423/239 |
| 3,885,020 A | 5/1975 | Whelan | 423/245 |
| 3,900,428 A | 8/1975 | Mai et al. | 252/462 |
| 3,925,001 A | 12/1975 | Salooja | 431/4 |
| 3,926,854 A | 12/1975 | Whelan et al. | 252/462 |
| 3,947,380 A | 3/1976 | Whelan et al. | 252/462 |
| 3,976,599 A | 8/1976 | Whelan | 252/462 |
| 3,987,146 A | 10/1976 | Clay et al. | 423/239 |
| 4,082,837 A | 4/1978 | Whelan | 423/405 |
| 4,088,606 A | 5/1978 | Fedor et al. | 252/465 |
| 4,107,063 A * | 8/1978 | Kovac et al. | 252/62.52 |
| 4,108,761 A | 8/1978 | Sze et al. | 208/254 H |
| 4,158,044 A | 6/1979 | Takabatake et al. | 423/235 |
| 4,273,749 A | 6/1981 | Kimura et al. | 423/231 |
| 4,289,737 A | 9/1981 | Acres et al. | 423/245 |
| 4,331,638 A | 5/1982 | Michelfelder | 423/210 |
| 4,366,085 A | 12/1982 | Ikegami et al. | 502/155 |
| 4,374,105 A | 2/1983 | Anderson et al. | 423/230 |
| 4,375,949 A | 3/1983 | Salooja | 431/7 |
| 4,397,321 A | 8/1983 | Stuetz | 131/334 |
| 4,433,065 A | 2/1984 | van der Burgt et al. | 518/703 |
| 4,513,098 A | 4/1985 | Tsao | 502/216 |
| 4,515,092 A | 5/1985 | Walsh et al. | 110/347 |
| 4,581,344 A | 4/1986 | Ledoux et al. | 502/304 |
| 4,591,430 A | 5/1986 | Hudson | 208/254 H |
| 4,804,388 A | 2/1989 | Kukin | 44/51 |
| 4,824,360 A | 4/1989 | Janka et al. | 431/7 |
| 4,836,117 A | 6/1989 | Teller et al. | 110/342 |
| 4,842,617 A | 6/1989 | Kukin | 44/51 |
| 4,843,980 A | 7/1989 | Markham et al. | 110/342 |
| 4,880,378 A | 11/1989 | Hums | 431/170 |
| 4,966,882 A | 10/1990 | Kato et al. | 502/309 |
| 5,024,905 A | 6/1991 | Itoh et al. | 429/44 |
| 5,055,029 A | 10/1991 | Avidan et al. | 431/7 |
| 5,087,600 A | 2/1992 | Kato et al. | 502/309 |
| 5,093,303 A * | 3/1992 | Tamaura | 502/338 |
| 5,110,452 A | 5/1992 | Meyer et al. | 208/423 |
| 5,118,282 A | 6/1992 | Reynolds et al. | 431/4 |
| 5,132,099 A | 7/1992 | Hiramatsu et al. | 423/584 |
| 5,176,088 A | 1/1993 | Amrhein et al. | 110/345 |
| 5,211,684 A | 5/1993 | Shannon et al. | 131/352 |
| 5,338,531 A | 8/1994 | Chuang et al. | 423/584 |
| 5,372,613 A * | 12/1994 | Mekonen | 44/301 |
| 5,378,443 A | 1/1995 | Engstrom et al. | 423/239.1 |
| 5,384,301 A | 1/1995 | Flytzani-Stephanopoulos et al. | 502/304 |
| 5,419,286 A | 5/1995 | Edison et al. | 123/1 A |

(Continued)

FOREIGN PATENT DOCUMENTS

DE   3317504   11/1984

(Continued)

OTHER PUBLICATIONS

Yohei Tanaka, Tatsuya Takeguchi, Ryuji Kikuchi and Kochi Eguchi, Influence of preparation method and additive for Cu-Mn spinel oxide catalyst on water gas shift reaction of reformed fuels, Nov. 2004, Applied Catalysis A: General 279, pp. 59-66.*

(Continued)

*Primary Examiner*—Glenn A Caldarola
*Assistant Examiner*—Ming Cheung Po
(74) *Attorney, Agent, or Firm*—Workman Nydegger (57) ABSTRACT

Organically complexed nanocatalyst compositions are applied to or mixed with a carbon-containing fuel (e.g., tobacco, coal, briquetted charcoal, biomass, or a liquid hydrocarbon like fuel oils or gasoline) in order to enhance combustion properties of the fuel. Nanocatalyst compositions can be applied to or mixed with a solid fuel substrate in order to reduce the amount of CO, hydrocarbons, and soot produced by the fuel during combustion. In addition, coal can be treated with inventive nanocatalyst compositions to reduce the amount of $NO_x$ produced during combustion (e.g., by removing coal nitrogen in a low oxygen pre-combustion zone of a low NOx burner). The nanocatalyst compositions include nanocatalyst particles made using a dispersing agent. At least a portion of the nanoparticles is crystalline with a spacing between crystal planes greater than about 0.28 nm. The nanocatalyst particles can be activated by heating to a temperature greater than about 75° C., more preferably greater than about 150° C. and most preferably greater than about 250° C.

18 Claims, 2 Drawing Sheets

U.S. PATENT DOCUMENTS

| | | | |
|---|---|---|---|
| 5,516,741 A | 5/1996 | Gascoyne et al. | 502/230 |
| 5,580,839 A | 12/1996 | Huffman et al. | 502/338 |
| 5,597,771 A | 1/1997 | Hu et al. | 502/304 |
| 5,612,010 A | 3/1997 | Pandey et al. | 423/239.1 |
| 5,662,051 A | 9/1997 | Morin | 110/344 |
| 5,671,758 A | 9/1997 | Rongved | 131/334 |
| 5,705,053 A | 1/1998 | Buchanan | 208/113 |
| 5,740,667 A | 4/1998 | Bhattacharyya et al. | 60/783 |
| 5,756,059 A | 5/1998 | Zamansky et al. | 423/239.1 |
| 5,823,758 A | 10/1998 | Lack | 431/4 |
| 5,846,898 A | 12/1998 | Chuang et al. | 502/181 |
| 5,866,501 A | 2/1999 | Pradhan et al. | 502/338 |
| 5,871,638 A | 2/1999 | Pradhan et al. | 208/422 |
| 5,899,678 A | 5/1999 | Thomson et al. | 431/2 |
| 5,925,588 A | 7/1999 | Chuang et al. | 502/181 |
| 5,936,134 A | 8/1999 | Mastral Lamarca et al. | 585/241 |
| 5,967,061 A | 10/1999 | Ashworth et al. | 110/203 |
| 6,007,699 A | 12/1999 | Cole | 208/134 |
| 6,033,641 A * | 3/2000 | Hall et al. | 423/239.2 |
| 6,054,507 A | 4/2000 | Funaki et al. | 523/210 |
| 6,090,858 A | 7/2000 | El-Sayed | 516/97 |
| 6,127,307 A | 10/2000 | Müller et al. | 502/162 |
| 6,159,267 A | 12/2000 | Hampden-Smith et al. | 75/252 |
| 6,168,775 B1 | 1/2001 | Zhou et al. | 423/584 |
| 6,194,338 B1 | 2/2001 | Andolfatto et al. | 502/101 |
| 6,206,685 B1 | 3/2001 | Zamansky et al. | 431/4 |
| 6,280,695 B1 | 8/2001 | Lissianski et al. | 423/239.1 |
| 6,401,634 B1 | 6/2002 | Anderson | 110/342 |
| 6,471,506 B1 | 10/2002 | Zamansky et al. | 431/4 |
| 6,494,153 B1 | 12/2002 | Lyon | 110/345 |
| 6,528,683 B1 | 3/2003 | Heidemann et al. | 562/542 |
| 6,534,661 B1 | 3/2003 | Zhou et al. | 549/531 |
| 6,551,960 B1 | 4/2003 | Laine et al. | 502/327 |
| 6,572,761 B2 | 6/2003 | Lyon | 208/113 |
| 6,612,249 B2 | 9/2003 | Sanders | 110/345 |
| 6,676,919 B1 | 1/2004 | Fischer et al. | 423/584 |
| 6,706,902 B2 | 3/2004 | Stürmann et al. | 549/523 |
| 6,716,525 B1 | 4/2004 | Yadav et al. | 428/402 |
| 6,740,133 B2 | 5/2004 | Hundley, Jr. | 44/301 |
| 6,740,615 B2 | 5/2004 | Zhou | 502/29 |
| 6,746,597 B2 | 6/2004 | Zhou et al. | 208/138 |
| 6,776,606 B2 | 8/2004 | Haskew | 431/2 |
| 6,782,892 B2 | 8/2004 | Li et al. | 131/364 |
| 6,923,945 B2 | 8/2005 | Chen | 423/239.1 |
| 2003/0005622 A1 | 1/2003 | Hundley | 44/443 |
| 2004/0007241 A1 | 1/2004 | Li et al. | 131/334 |
| 2004/0013601 A1 | 1/2004 | Butz et al. | 423/584 |
| 2004/0037770 A1 | 2/2004 | Fischer et al. | 423/584 |
| 2004/0168365 A1 | 9/2004 | Hundley | 44/603 |
| 2004/0241502 A1 | 12/2004 | Chung et al. | 428/702 |
| 2004/0248733 A1* | 12/2004 | Tagawa et al. | 502/311 |
| 2005/0016057 A1 | 1/2005 | Factor et al. | 44/354 |
| 2005/0108925 A1 | 5/2005 | Jurng et al. | 44/457 |
| 2005/0109356 A1 | 5/2005 | Reddy et al. | 131/334 |
| 2005/0211259 A1* | 9/2005 | Gedevanishvili | 131/334 |
| 2005/0257724 A1 | 11/2005 | Guinther et al. | 110/345 |
| 2006/0117651 A1 | 6/2006 | Hundley | 44/641 |

FOREIGN PATENT DOCUMENTS

| | | |
|---|---|---|
| JP | 4-136601 | 5/1992 |
| JP | 4-136602 | 5/1992 |
| WO | WO 90/15423 * | 12/1990 |
| WO | WO 98/45037 | 10/1998 |
| WO | WO 02/058825 | 8/2002 |
| WO | WO 02083550 | 10/2002 |
| WO | WO 03/086115 | 10/2003 |
| WO | WO 2004/110184 | 12/2004 |
| WO | WO 2005/039327 | 5/2005 |
| WO | WO 2005/039328 | 5/2005 |

OTHER PUBLICATIONS

Ahmadi, et al., "Sharpe-Controlled Synthesis of Colloidal Platinum Nanoparticles" *Science*, vol. 272, pp. 1924-1926 (Jun. 28, 1996).

Asami, Kenji, et al., "Highly Active Iron Catalysts from Ferrie Chloride for the Steam Gasification of Brown Coal" *American Chemical Society*, Ind. Eng. Chem. Res. 1993, 32, pp. 1631-1636.

Fuel Tech—Fuel Chem® Solutions to Boiler Slagging and Fouling Problems, retrieved from the internet: http://www.fuel-tech.com/fuelchem.htm.

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Mori, Hiroshi, et al., "Role of Iron Catalyst in Fate of Fuel Nitrogen during Coal Pyrolysis" Institute for Chemical Reaction Science, Tohoku University, Sendai, Japan, pp. 1022-1027 (Mar. 6, 1996).

Ohtsuka, Yasuo, et al., "Char-Nitrogen Functionality and Interactions between the Nitrogen and Iron in the Iron-Catalyzed Conversion Process of Coal Nitrogen to $N_2$ " Research Center for Organic Resources and Material s Chemistry, Institute for Chemical Reaction Science, Tohoku University, Sendai, Japan, pp. 1356-1362, (May 6, 1998).

Ohtsuka, Yasuo, et al., "Nitrogen Removal During Atmospheric-Pressure Pyrolysis of Brown Coal with Iron" *Fuel*, 1994, vol. 73 No. 7, pp. 1093-1097.

Ohtsuka, Yasuo, et al., "Selective Conversion of Coal Nitrogen to $N_2$ with Iron", Research Center for Carbonaceous Resources, Institute for Chemical Reaction Science, Tohoku, Japan, pp, 1095-1096 (Aug. 3, 1993).

Tsubouchi, Naoto, et al., "Nitrogen Release During High Temperature Pyrolysis of Coals and Catalytic Role of Calcium in $N_2$ Formation", Research Center for Sustainable Material Engineering, Institute of Multidisciplinary Research for Advanced Material, Tohoku, Japan, pp. 2335-2342 (Mar. 20, 2002).

Wang, H.P., et al., "Spectroscopic Studies of Coal Maceral Depolymerization Effected by an Iron-Based Catalystl" U.S. Department of Energy 1992, http://www-acerc.byu.edu/Abstracts/19. (1992).

Wu, Zhiheng, et al., "Catalytic Nitrogen Release During a Fixed-Bed Pyrolysis of Model Coals Containing Pyrrolic or Pyridinic Nitrogen" Surface Chemistry Department, National Institute of Material and Chemical Research, Tsukuba, Japan, Energy Resource Department, National Institute and Environment, Tsukuba, Japan, pp. 251-254 (Sep. 16, 1999).

Wu, Zhiheng, et al., "Formation of Nitrogen-Containing Compounds during Slow Pyrolysis and Oxidation of Petroleum Coke" Institute for Chemical Reaction Science, Tohoku University, Sendai, Japan, (Jan. 17, 1997).

Wu, Zhiheng, et al., "Key Factors for Formation of $N_2$ from Low-Rank Coals during Fixed Bed Pyrolysis: Pryolysis Conditions and Inherent Minerals" Institute for Chemical Reaction Science, Tohoku University, Sendai, Japan, pp. 902-908 (Feb. 4, 1997).

Wu, Zhiheng, et al., "Remarkable Formation of $N_2$ from a Chinese Lignite during Coal Pyrolysis", Research Center for Carbonaceous Resources, Institute for Chemical Reaction Science, Tohoku, Japan, pp. 1280-1281 (Aug. 20, 1996).

Zhou, et al., "Novel Synthesis of Highly Active Pt/C Cathode Electrocatalyst for Direct Methanol Fuel Cell" Chem. Commun. 2003, pp. 394-395.

Wu et al., "Nitrogen Distribution in a Fixed Bed Pyrolysis of Coals with Different Ranks: Formation and Source of $N_2$ ", Institute for Chemical Reaction Science, Tohoku University, Sendai 980-77, Japan, Aug. 5, 1996.

* cited by examiner

CRYSTALLINE NANOCATALYSTS FOR IMPROVING COMBUSTION PROPERTIES OF FUELS AND FUEL COMPOSITIONS INCORPORATING SUCH CATALYSTS

BACKGROUND OF THE INVENTION

1. The Field of the Invention

The present invention relates to nanocatalysts for use in improving the combustion properties of fuels. In particular, the present invention relates to nanocatalysts with a desired crystalline structure for improving combustion of fuels.

2. Related Technology

Carbon-containing fuels typically combust to yield mainly carbon dioxide and water as the major products of combustion. Due to incomplete combustion, however, other more harmful molecules can be formed, such as carbon monoxide (CO), hydrocarbons and soot. Impurities in the fuel can also yield significant quantities of ash, $SO_x$ and $NO_x$. Due to increased environmental awareness and stricter governmental guidelines, there are ongoing efforts to reduce the release of harmful emissions into the environment.

Coal combustion is a major source of energy for the production of electricity throughout the world. Coal is a good source of energy because of its high energy to weight ratio and its great abundance. The use of coal, however, is increasingly under scrutiny because of environmental concerns. Among the known environmental difficulties with coal combustion is the production and emission of $NO_x$ compounds, such as NO, $N_2O$, and $NO_2$. $NO_x$ compounds can be very harmful to human health and are known to produce undesirable environmental effects such as smog.

Government regulations require emission from coal burning to be monitored and controlled. Controlling $NO_x$ emissions has become increasingly difficult as government regulations continue to lower the allowable level of $NO_x$ and other pollutants that can be released into the environment. The requirement for reduced pollutants from coal-fired power plants has led to a demand for suitable new technologies.

In a coal fired power plant, there are two principle sources of $NO_x$ formation: fuel $NO_x$ and thermal $NO_x$. Fuel $NO_x$ is $NO_x$ that forms from nitrogen found in the fuel, whereas thermal $NO_x$ is formed from other sources of nitrogen such as nitrogen in the air. About 80% of $NO_x$ emissions from coal combustion are produced from fuel nitrogen.

One method used to reduce pollutants during coal combustion focuses on removing $NO_x$ from power plant flue gas. For example, $NO_x$ emitted in flue gas can be removed using selective catalytic reduction (SCR), which converts $NO_x$ compounds to nitrogen gas ($N_2$) and water. However, this type of $NO_x$ control method is expensive, in part, because of the required capital investment. The cost of these technologies and increasingly stringent government regulations have created a need for less expensive technologies to reduce $NO_x$ emissions from coal combustion.

Another method of reducing $NO_x$ emissions is to remove coal nitrogen from the coal material by converting it to $N_2$. Recently, researchers have discovered that iron-based catalysts can assist in releasing fuel nitrogen from coal. One problem with dispersed iron-based catalysts used to reduce pollutants during combustion is the amount of metal that needs to be applied to the fuel to obtain desirable results. If too much metal is added to the fuel, the presence of the metal can undesirably affect combustion performance of the fuel and/or negatively affect the composition of combustion products such as fly ash. In addition, high metal loadings can make the catalyst cost-prohibitive for many commercial applications.

There is a need to improve the performance of dispersed metal catalyst for reducing pollutants generated during combustion. Even small improvements in catalyst performance can have a significant impact on the amount of catalyst used for a particular application and/or the amount of pollutants removed from the combustion gases.

BRIEF SUMMARY OF THE INVENTION

The present invention provides nanocatalyst compositions that can be applied to or mixed with fuels such as tobacco, coal, briquetted charcoal, wood, biomass, or hydrocarbon liquids (e.g., jet fuel, diesel, heavy fuel oils, and gasoline) to improve the combustion properties of such fuels. The catalyst compositions include nanocatalyst particles that have a desired crystallinity for improving fuel combustion.

According to one aspect of the invention, catalyst compositions include a plurality of catalyst atoms complexed with a dispersing agent. The catalyst complexes may comprise a solution, colloid, or a suspension of nanoparticles. The active catalyst atoms typically include one or more of iron, chromium, manganese, cobalt, nickel, copper, zirconium, tin, zinc, tungsten, titanium, molybdenum, and vanadium. The dispersing agent typically includes organic molecules that include one or more functional groups selected from the group of a hydroxyl, a carboxyl, a carbonyl, an amine, an amide, a nitrile, an amino acid, a thiol, a sulfonic acid, an acyl halide, a sulfonyl halide, or a nitrogen with a free lone pair of electrons.

The nanoparticles formed from the organically complexed catalyst atoms are at least partially crystalline. In one embodiment, the desired crystalline structure is achieved during formation of the nanoparticles. In an alternative embodiment, the crystalline structure is achieved upon activation (e.g., by heating). The crystal lattice of the nanoparticles of the present invention have exposed crystal planes that are spaced at least about 0.28 nm apart, more preferably greater than about 0.30 nm, and most preferably greater than about 0.32 nm. In a preferred embodiment, the crystal lattice comprises $Fe_3O_4$ crystals (magnetite). Surprisingly, nanoparticles having exposed crystal planes spaced greater than about 0.28 nm show improved catalytic activity. It is believed that the spacing between crystal planes in the catalysts of the present invention increases the strain of C—C or C—N bonds in fuel products, which facilitates the breaking of C—C and C—N bonds.

According to one embodiment, the catalyst complex comprises a suspension of organically complexed nanocatalyst particles having a size less than about 1 micron as a suspension within a solvent. One advantage of the suspension is that the nanocatalyst particles are stable such that the suspension can be easily stored and transported without substantial agglomeration of the nanocatalyst particles. This allows a catalyst composition according to the invention to be prepared, stored, and then transported as needed, thus obviating the need to form the catalyst on-site at the time it is applied to a fuel substrate. The catalyst suspension may be applied using simple techniques, such as spraying, which adds negligible or minimal cost to the operation of, e.g., a coal-fired power plant.

According to another aspect of the invention, a fuel composition is provided comprising a fuel substrate and a plurality of organically complexed nanocatalyst particles on and/or mixed with the fuel substrate. As discussed above, the fuel substrate may comprise tobacco, coal, coal briquettes, wood, biomass, or a liquid hydrocarbon such as fuel oils and gasoline.

Another feature of fuel compositions according to the invention is that the dispersing agent binds to at least a portion of the catalyst atoms and prevents or inhibits agglomeration of the nanocatalyst particles during combustion, pyrolysis, or other high temperature conditions to which the fuel compositions may be exposed. Thus, the organically complexed nanocatalyst particles according to the invention have greater stability under extreme temperature conditions compared to conventional metal catalysts. The dispersing agent acts to stabilize the nanocatalyst particles and prevents deactivation. In some cases, the nanocatalyst particles may even be anchored to the fuel substrate, thereby preventing or inhibiting sintering or agglomeration of the catalyst particles during pre-combustion processing, and possibly even during at least a portion of the combustion process itself. Preventing agglomeration of the nanocatalyst particles maintains the benefit of nano-sized catalyst particles for longer periods of time compared to conventional catalysts.

The nanocatalyst compositions according to the invention also increase catalyst efficiency, thereby allowing for lower catalyst loadings within a fuel composition and/or increasing catalyst activity. The dispersion and stability of the nanocatalyst particles increases the activity of the catalyst such that lower amounts of the catalyst can be loaded while still providing a desired level of catalytic activity.

In an exemplary method according to the present invention, a nanoparticle catalyst is formed by: (i) providing a plurality of active catalyst atoms; (ii) providing a dispersing agent that includes at least one functional group selected from the group consisting of a hydroxyl, a carboxyl, a carbonyl, an amine, an amide, a nitrile, a nitrogen with a lone pair of electrons, an amino acid, a thiol, a sulfonic acid, sulfonyl halide, and an acyl halide; (iii) reacting the catalyst atoms and the dispersing agent to form the catalyst complex, which may be in the form of a solution, colloid, or suspension; (iv) optionally mixing the catalyst with a carbon-containing fuel, and (v) activating the catalyst atoms by heating the nanocatalyst particles to a temperature greater than 75° C.

Nanocatalyst particles activated by heating have showed improved performance over catalysts that are not activated by heating. Preferably the catalyst is activated by heating to greater than 75° C., more preferably greater than 150° C., and most preferably greater than abut 250° C. It is believed that the improved catalyst performance obtained by performing the heat treatment is due in part to (i) an increase in the percent of desired crystalline structure and/or the formation of a desired crystal lattice (e.g., $Fe_3O_4$) and/or (ii) removal of all or a portion of the organic material bonded to the nanoparticles. The $Fe_3O_4$ crystal lattice is believed to increase bond strains during oxidation of C—C and C—N bonds.

These and other advantages and features of the present invention will become more filly apparent from the following description and appended claims as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

The present invention encompasses organically complexed nanocatalyst compositions for use with a fuel in order to improve the combustion properties of the fuel. The nanocatalysts are at least partially crystalline and have exposed crystal planes with a spacing of at least about 0.28 nm between crystal planes (e.g., $Fe_3O_4$). The combination of organically complexed nanocatalyst particles and a fuel substrate forms a fuel composition within the scope of the invention. The invention also encompasses methods for manufacturing catalyst complexes, organically complexed nanocatalyst particles, and fuel compositions that include such nanocatalyst compositions.

Organically complexed nanocatalyst particles according to the invention have a size less than 1 micron and can be applied to or mixed with carbon-containing fuels such as tobacco, coal, briquetted charcoal, wood, biomass, and liquid hydrocarbons in order to improve the combustion properties of such fuels. In the case of tobacco, the inventive nanocatalyst compositions provide for the conversion of carbon monoxide and nitric oxide to safer substances such as carbon dioxide and nitrogen. The nanocatalyst compositions would be expected to reduce the formation of carbon monoxide and nitric oxide in other carbon-containing fuels, such as coal, briquetted charcoal, wood, biomass, and liquid hydrocarbons. In the case of coal, the inventive nanocatalyst compositions may also provide the added benefit of helping to convert coal source nitrogen into nitrogen gas in a low oxygen portion of a coal burner (e.g., in a conventional low $NO_x$ burner).

For purposes of this disclosure and the appended claims, the term "tobacco" includes both natural tobacco and tobacco substitutes which are combustible and designed to mimic natural tobacco in one or more aspects, such as chemical stimulation and/or burning properties.

The term "tobacco smoke" means the mixture of gases and particulates given off as the tobacco composition undergoes combustion, pyrolysis, and/or heating.

For purposes of this disclosure, the term "catalyst" does not exclude atoms, molecules, and/or particles that are consumed in a reaction, such as the degradation of unwanted molecules in tobacco smoke or during combustion of another carbon-based fuel, such as coal, briquetted charcoal, wood, biomass, or liquid hydrocarbons. For example, in some embodiments, the catalysts of the present invention may be consumed by reduction or oxidation during combustion or other high temperature operations.

The terms "briquetted charcoal" and "charcoal briquettes" shall refer to solid pieces of charcoal comprising individual charcoal particles that are bonded, compacted, or otherwise held together so as to be something other than a pulverized powder. In general, the terms "briquetted charcoal" and "charcoal briquettes" shall refer to any form of charcoal other than "activated charcoal", "activated carbon" and "carbon black," as those terms are defined in the art.

The term "biomass" refers to any plant-derived fuel material from any plant source whatsoever. Examples include waste stocks, leaves, or other materials from grains, husks, shells, or other materials resulting from the harvesting and processing of grains, nuts, fruits, or other edible plant products. It also refers to hemp, grass, leaves, stocks, or other plant materials specifically grown for the purpose of producing biomass fuel. It includes wood chips, sawdust, or other scrap materials resulting from the milling or processing of lumber and other wood products, and the like.

The term "carbon-based fuel" or "fuel substrate" shall refer to any solid, or semi-solid, viscous liquid, or liquid fuel material, but shall exclude forms of carbon that, though possibly flammable or combustible, are not in a form or produced at a sufficiently low cost to make them primarily usable as a fuel (i.e., carbon black, activated charcoal, or activated carbon designed for use as a filtration or scavenging material).

II. Organically Complexed Catalyst Compositions

Organically complexed nanocatalyst compositions include a catalyst complex formed by reacting one or more active catalyst atoms and one or more dispersing agent and, optionally, a solvent. The catalyst complex may be in the form of nanocatalyst particles or may be a precursor thereto. The organically complexed nanocatalyst compositions according to the invention may be in the form of a solution, colloid, or suspension when mixed with a solvent, or they may be in the form of a concentrated or dried material upon removal of the solvent. The dried composition can be reconstituted so as to form a solution, colloid, or suspension upon reintroducing one or more solvents into the composition.

A. Catalyst Complexes

Catalyst complexes according to the invention include one or more different types of active catalyst atoms complexed with one or more different types of dispersing agents. When so complexed, the catalyst atoms are arranged in such a manner that the catalyst atoms either (i) form dispersed, crystalline nanocatalyst particles in solution or suspension or (ii) that upon contact with a fuel substrate and/or after undergoing activation (e.g., heat activation), the complexed catalyst atoms form dispersed nanocatalyst particles. In either case, the dispersing agent can form a catalyst complex to produce nanoparticles that are dispersed, stable, uniform, and/or desirably sized.

1. Active Catalyst Atoms

The active catalyst atoms useful in practicing the present invention are metal atoms or elements, such as iron or other metals, that can form nanocatalyst particles capable of catalyzing desired reactions during combustion of the fuel (e.g., the conversion of $NO_x$ to non-polluting gases such as $N_2$ in the case of coal and/or the conversion of CO to $CO_2$ and NO to $N_2$ during combustion of any carbon-based fuel, such as tobacco, coal, briquetted charcoal, wood, biomass, and liquid hydrocarbons). These include elements or groups of elements that exhibit primary catalytic activity, as well as promoters and modifiers.

As the primary active catalyst component, base transition metals are preferred due to their valence characteristics and/or their relatively low cost compared to noble metals and rare earth metals. Examples of base transition metals that exhibit catalytic activity when mixed with a fuel include iron, chromium, manganese, cobalt, nickel, copper, zirconia, tin, zinc, tungsten, titanium, molybdenum, and vanadium. In the case of coal, particularly where it is desired to assist in reducing coal nitrogen to nitrogen gas prior to combustion, preferred catalyst metals include one or more of iron, nickel, cobalt, manganese, vanadium, copper, and zinc.

The primary catalysts listed above may be used alone or in various combinations with each other or in combination with other elements, such as noble metals, rare earth metals, alkaline metals, alkaline earth metals, or even non-metals.

In general, the primary active catalyst component will comprise at least about 50% of the active catalyst atoms in the catalyst complex. This percentage measures the actual number of catalyst atoms or their molar ratio. In a preferred embodiment, at least 50% of the active catalyst atoms are iron. Iron is typically preferred as the primary active catalyst because of its low cost and also because of its electron valence characteristics. The iron catalyst atoms may be provided in the form of iron metal, iron chloride, iron sulfate, iron nitrate, or other iron salts. The iron catalyst precursor may either be insoluble in an aqueous medium, as in the case of iron metal, or it may be soluble, as in the case of iron chloride and other iron salts. In a preferred embodiment, iron metal is used in order to avoid incorporating compounds that include the anion of the iron salt.

The catalyst atoms may also include a minority metal component to modify or promote the catalytic function of the above mentioned metals. Examples of minority metals that can be added to the catalyst composition in addition to the primary catalyst component include ruthenium, palladium, silver, platinum, nickel, cobalt, vanadium, chromium, copper, zinc, molybdenum, tin, manganese, gold, rhodium, zirconium, tungsten, rhenium, osmium, iridium, titanium, cerium and the like. These components can be added in metal form or as a salt.

Optionally non-transition metals can also be included, typically as promoters or modifiers. Suitable non-transition metals include alkali metals and alkali earth metals, such as sodium, potassium, magnesium, calcium, etc., and non-metals such as phosphorus, sulfur, and halides.

2. Dispersing Agents

In addition to catalyst atoms, the catalyst complexes of the present invention include one or more dispersing agents. The dispersing agent is selected to promote the formation of nanocatalyst particles that have a desired stability, size and/or uniformity. Dispersing agents within the scope of the invention include a variety of small organic molecules, polymers and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding. The bonding between the dispersing agent and the catalyst atoms can promote dispersion of the catalyst atoms, promote anchoring of the catalyst nanoparticles to a fuel substrate, and/or prevent agglomeration of catalyst nanoparticles.

To provide the bonding between the dispersing agent and the catalyst atoms, the dispersing agent includes one or more appropriate functional groups. In one embodiment, the functional group(s) comprise a carbon atom bonded to at least one electron-rich atom that is more electronegative than the carbon atom and that is able to donate one or more electrons so as to form a bond or attraction with a catalyst atom. A bond can also be formed where the functional group accepts one or more electrons or shares one or more electrons with the catalyst atoms. Preferred dispersing agents include functional groups which have either a charge or one or more lone pairs of electrons that can be used to complex a metal catalyst atom, or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol; suflobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. In the case where the fuel is coal, charcoal, wood, biomass, or a liquid hydrocarbon, the molar ratio of dispersing agent functional groups to catalyst atoms is preferably in a range of about 0.001:1 to about 50:1, more preferably in a range of about 0.005:1 to about 20:1, and most preferably in a range of about 0.01:1 to 10:1. In the case where the fuel is tobacco, the molar ratio of dispersing agent functional groups to catalyst atoms is preferably in a range of about 0.01:1 to about 40:1, more preferably in a range of about 0.05:1 to about 30:1, and most preferably in a range of about 0.1:1 to about 20:1.

The dispersing agents of the present invention allow for the formation of very small and uniform nanoparticles. In general, the nanocatalyst particles formed in the presence of the dispersing agent are less than 1 micron in size. In the case where the nanocatalyst composition is used within a tobacco fuel composition, the nanocatalyst particles are preferably less than about 100 nm in size, more preferably less than about 10 nm, even more preferably less than about 6 nm, and most preferably less than about 4 nm. In some cases, the nanocatalyst particles may form clusters as the size approaches the atomic scale. In the case where the fuel composition includes coal, briquetted charcoal, wood, biomass, or a liquid hydrocarbon, the nanocatalyst particles are preferably less than about 300 nm in size, more preferably less than about 100 nm, even more preferably less than about 50 nm, and most preferably less than about 10 nm.

Finally, depending on the desired stability of the nanocatalyst particles within the fuel composition, the dispersing agent can be selected in order to act as an anchor between the nanocatalyst particles and the fuel substrate. While the dispersing agent has the ability to inhibit agglomeration of the nanocatalyst particles in the absence of anchoring, chemically bonding the nanocatalyst particles to the fuel substrate surface by means of the dispersing agent is an additional and particularly effective mechanism for preventing agglomeration.

During thermal degradation and combustion of the fuel composition, the dispersing agent can inhibit deactivation of the nanocatalyst particles, which likely occurs due to agglomeration of catalyst particles. This ability to inhibit deactivation can increase the temperature at which the nanocatalysts can perform and/or increase the useful life of the nanocatalyst in the extreme conditions of combustion, e.g., in a coal burner, an industrial burner, backyard barbeque, campfire, or cigarette. Even if including the dispersing agent only preserves catalytic activity for a few additional milliseconds, or even microseconds, the increased duration of the nanocatalyst can be very beneficial at high temperatures, given the dynamics of fuel combustion and pollution formation.

Depending on the type of fuel composition and/or the manner in which the fuel composition is to be utilized, the organically complexed nanocatalyst particles may be applied or anchored to a support material apart from the fuel substrate. The use of a support material may be advantageous in order to more fully and completely disperse the organically complexed nanocatalyst particles throughout the fuel material. The support material may result in a more active nanocatalyst particle by inducing more active sites per unit of catalyst material.

B. Solvents and Other Additives

The liquid medium in which the organically complexed nanocatalyst composition is prepared may contain various solvents, including water and organic solvents. Solvents participate in catalyst formation by providing a solution for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension, as described more fully below. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The selection of a particular solvent is often dictated by cost. While there may in some instances be certain advantages in the use of organic solvents, the cost of either recovering the organic solvent or allowing the organic solvent to be consumed with the catalyst during combustion of the coal may result in a significant economic disadvantage for the use of organic solvents. Therefore, liquids which contain mostly or entirely water are the preferred solvents for the present invention.

However, if an organic solvent is used, the solvent can be recovered using known methods such as distillation. Alternatively, if the organic solvent is not recovered, it can provide some fuel value when consumed during coal combustion.

The catalyst composition can also include additives to assist in the formation of the nanocatalyst particles. For example, mineral acids and basic compounds can be added, preferably in small quantities (e.g., less than 5 wt %).

Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easily separated from the final iron catalyst solution or suspension using simple techniques such as centrifugation and filtration.

Solid materials can also be added to remove unwanted byproducts. For example, activated carbon is a relatively inexpensive material that can be used to remove some unwanted by-products from the catalyst preparation.

C. Supports and Support Materials

Organically complexed nanocatalyst particles can be isolated on a support surface if desired. In an exemplary embodiment, the nanocatalyst particles are supported by the fuel substrate itself. According to one embodiment, the fuel substrate may include functional groups to which the dispersing agent can bond.

Alternatively, the organically complexed nanocatalyst particles can be formed on a separate solid support. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber. In the case of a cigarette, the solid support may be a filter attached to and forming part of the cigarette, or it may be some other part of the cigarette such as the paper which forms the outer wrapping.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports include carbon-based materials, such as carbon black, activated carbon, graphite, fluoridated carbon, and the like. Other supports include polymers and other inorganic solids, metals, and metal alloys. Organic supports are advantageous in the case where it is desired for the support to burn up with the fuel substrate.

In the case where the nanocatalyst particles are attached to a support, they may be deposited within a wide range of loadings on the support material. The loading can range from about 0.01% to about 70 wt % of the supported nanocatalyst particles exclusive of the fuel substrate, more preferably in a range of about 0.1% to about 25%. In the case where the support material is porous, it is preferable for the surface area to be at least 20 $m^2/g$, more preferably greater than 50 $m^2/g$.

III. Methods of Making Nanocatalyst Compositions and Particle Suspensions

The process for manufacturing organically complexed nanocatalyst particles can be broadly summarized as follows. First, one or more types of catalyst atoms and one or more types of dispersing agents are selected. Second, the catalyst atoms (e.g., in the form of a ground state metal or metal salt) and dispersing agent (e.g., in the form of a carboxylic acid salt) are reacted or combined together to form a catalyst complex. The catalyst complex is generally formed by first dissolving the catalyst atoms and dispersing agent in an appropriate solvent or carrier and then allowing the catalyst atoms to arrange themselves into catalyst complexes. The catalyst complexes react to form nanoparticles in the liquid solvent or carrier. The nanoparticles are preferably activated by heat treatment. The various components may be combined or mixed in any sequence or combination. In addition, a subset of the components can be premixed prior to addition of other components, or all components may be simultaneously combined.

In one aspect of the invention, the catalyst complex may be considered to be the complexed catalyst atoms and dispersing agent, exclusive of the surrounding solvent or carrier. Indeed, it is within the scope of the invention to create a catalyst complex in a solution, a colloid, or a suspension, and then remove the solvent or carrier so as to yield a dried catalyst complex. The dried catalyst complex can be applied to and/or mixed with a fuel substrate in such a form, or can be reconstituted as a solution, colloid, or suspension by adding an appropriate solvent.

In an exemplary embodiment, the components are mixed for a period of about 1 hour to about 15 days. This mixing is typically conducted at temperatures ranging from 0° C. to 200° C. Preferably the temperature does not exceed 100° C. The preparation of the catalyst complex is typically exothermic, so provisions for cooling may be used to control the temperature. The temperature can be held at a constant value throughout the mixing step, or it can be programmed to change during the mixing period.

The preparation of the catalyst complex can evolve hydrogen gas, which can require provisions for handling the gas pressure. Normally, the mixing step will be conducted at or near atmospheric pressure, although elevated pressure may be needed in cases where the mixing is conducted at elevated temperature, especially those exceeding the normal boiling point of the liquid mixture. In one embodiment, an inert gas flow may be provided to safely purge any evolved gases from the mixing apparatus.

According to one currently preferred embodiment, the catalyst atoms used to form nanocatalyst particles comprise iron metal. Using iron metal can be advantageous because iron metal does not form an anion by-product. After mixing with the dispersing agents and optional additives, the iron metal is converted to an active catalyst form and becomes dissolved or suspended in the solvent. Typically the only significant by-product of the catalyst preparation using iron metal is hydrogen gas, which is evolved during the mixing procedure.

In another embodiment, the catalyst atoms are provided as precursors in the form of an iron salt such as iron chloride, iron nitrate, iron sulfate, and the like. These compounds are soluble in an aqueous solvent. However, formation of the catalyst nanoparticles leads to the formation of additional by-products from the release of the anion in the iron salt.

The anion-containing by-product may remain in the catalyst mixture; however, it is usually beneficial to remove the by-product to prevent the heteroatoms from having deleterious effects on equipment used in coal combustion. In the case where the byproduct is in solid form, it may be removed by filtration, centrifugation, or the like. In the case where the byproduct is in liquid form, the byproduct can be removed by distillation, absorption, adsorption, extraction, ion exchange, membrane separation, or the like.

The complexed catalyst atoms react to form nanoparticles. The nanoparticles can form spontaneously by allowing the reaction mixture to stand. The nanoparticles can also be caused to form using a reducing agent such as hydrogen gas, which is bubbled through the reaction mixture or otherwise contacted with the catalyst complexes.

The nanoparticles are preferably activated by heat treatment. The heat treatment can cause formation of nanoparticles having a desired crystal lattice. For example, heat treatment of iron-based nanoparticles can cause formation of nanoparticles having an $Fe_3O_4$ crystal lattice. In a preferred embodiment, the heat treatment is performed at a temperature greater than 75° C., more preferably greater than 150° C., and most preferably greater than about 250° C. It is believed that the heat treatment step can also activate the nanoparticles by removing a portion or all of the organic dispersing agent molecules bonded to the catalyst atoms. In a preferred embodiment at least a portion of the organic material remains such that it can assist in anchoring the catalyst particles to a substrate and/or inhibit the agglomeration of nanoparticles during combustion.

Other factors that can affect the type of crystal lattice produced include the starting reagents. For example, nanoparticles formed from an iron powder typically produce nanoparticles with an $Fe_3O_4$ crystal lattice.

Figure 1:
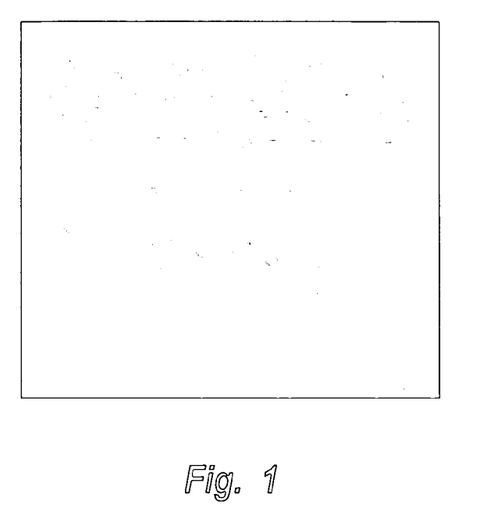
FIG. 1 is a TEM image of iron oxide nanoparticles manufactured according to an exemplary embodiment of the present invention.

The nanocatalysts of the present invention are at least partially crystalline. The metal atoms are arranged in an ordered structure that forms a plurality of crystal planes. At the surface of the nanoparticles, the crystal planes are exposed. FIG. 1 is a TEM image showing the crystallinity of an exemplary iron oxide nanoparticle. The exposed crystal planes appear as parallel lines in the TEM images.

The crystal planes serve as a binding site for the oxidation of C—C bonds and C—N bonds. The spacing between crystal planes of the particles of the present invention increases the strain on the C—C and C—N bonds as compared to amorphous materials or particles with different crystal lattice spacing. The increased strain increases the ease and rate at which these bonds are broken, thereby catalyzing the oxidation and removal of nitrogen from carbon.

The spacing between the crystal planes is preferably greater than about 0.28 nm, more preferably greater than about 0.30 nm, and most preferably greater than about 0.32 nm. The nanoparticles of the present invention preferably have an $Fe_3O_4$ crystal lattice, which has crystal planes with a spacing of about 0.30 nm. Other suitable crystal lattices can occur in crystals of manganese, iron cobalt, nickel, copper, tin, zinc, tungsten, molybdenum, and oxides of these.

The nanoparticles of the present invention have been found to be surprisingly stabile. The stability of the nanocatalyst particles prevents the particles from agglomerating together and maintains them in suspension. Even where some or all of the nanocatalyst particles settle out of suspension over time, the nanocatalyst particles can be easily re-suspended by mixing. The stable suspension is particularly advantageous because it can be shipped, stored, transported, and easily applied to a fuel substrate (e.g., tobacco, a coal stream, briquetted charcoal, wood, biomass, or a liquid hydrocarbon).

Because of the strong price pressures on energy production, the cost effective production and application of the nanocatalyst compositions to a fuel substrate may be important in maintaining the economic viability of their use. In one embodiment, the low cost of iron-based precursors, solvent, and dispersing agents are particularly beneficial for minimizing cost.

In one embodiment of the present invention, the concentration of metal catalyst in the suspension may be increased to reduce shipping costs, to more easily apply the catalyst composition to a fuel substrate, and/or improve catalyst performance. Typically, the nanocatalyst solution colloid or suspension contains at least about 0.1% by weight active catalyst atoms. In a preferred embodiment, the final catalyst solution or suspension contains at least about 5% by weight of active catalyst atoms, more preferably at least about 7.5% active catalyst atoms by weight, and most preferably at least about 10% active catalyst atoms by weight. In one embodiment, the nanocatalyst composition is dried and then reconstituted prior to use, as discussed above.

IV. Fuel Compositions and Related Methods

Fuel compositions according to the invention include at least one type of carbon-containing fuel substrate and at least one type of organically complexed nanocatalyst applied on or mixed with the fuel substrate. Exemplary fuel substrates include tobacco, coal, briquetted charcoal, wood, biomass, and liquid hydrocarbons, such as diesel, jet fuel, heavy fuel oils, and gasoline. The complexed nanocatalyst particles can be applied to or mixed with a fuel substrate using any desired method, including dipping, spraying, mixing, compacting, etc.

The organically complexed nanocatalyst particles improve one or more burn properties or characteristics of the fuel, e.g., reducing CO, NO, and unburned hydrocarbons and soot in any fuel. In the case of coal, the organically complexed nanocatalyst particles may also assist in removing and converting coal nitrogen to nitrogen gas prior to combustion in a low oxygen zone of a burner (e.g., within a conventional low NOx burner).

A. Tobacco Compositions and Articles

Organically complexed nanocatalyst particles can be combined with tobacco to make enhanced tobacco compositions and articles, such as cigarettes and cigars. The complexed nanocatalyst particles are associated with the tobacco such that upon combustion and/or pyrolysis of the tobacco, the smoke produced therefrom comes into contact with the nanocatalyst particles. The nanocatalyst particles help degrade the undesirable small molecules (e.g., CO and NO) before the smoke is inhaled by a user. Most tobaccos can be used with the present invention.

The complexed nanocatalyst particles of the present invention can be placed anywhere in or on a smoking article so long as smoke can come into contact with the nanoparticles during use. In an exemplary embodiment, supported and/or unsupported complexed nanocatalyst particles are associated with a tobacco material by positioning them sufficiently close to gasses in tobacco smoke that the nanocatalyst can perform its catalytic function. The complexed nanocatalyst particles can be directly mixed with the tobacco material. Alternatively, they can be associated with the tobacco material by being deposited between the tobacco material and the filter of a cigarette. The complexed nanocatalyst particles can be disposed within the filter or be present in or on tobacco paper used to make a cigarette.

Because the complexed nanocatalyst particles are stable and highly active, catalyst loadings applied to the tobacco and/or filter can be significantly lower than catalyst loadings in the prior art. In an exemplary embodiment, the complexed nanocatalyst particles comprise iron mixed with a tobacco material with a metal loading less than about 30% by weight of the tobacco composition, more preferably less than about 15% by weight, and most preferably less than about 5% by weight.

In one embodiment, it is possible for the complexed nanocatalyst particles, at elevated temperatures, to be consumed in a redox reaction. In yet another embodiment, the complexed nanocatalyst particles can perform a catalytic function at one temperature and an oxidative and/or reductive function at another temperature.

Temperatures in a burning cigarette can reach temperatures between 200° C. and 900° C. At such temperatures, traditional catalyst particles can sinter and agglomerate to form larger particles, which can deactivate the catalyst particles by reducing the surface area available for catalysis and/or oxidation or reduction. In contrast, the nanocatalyst particles of the present invention are complexed with an organic complexing agent, such as glycolic acid, which help prevent or at least delay agglomeration and catalyst deactivation sufficiently as to be effective to increase combustion efficiency.

In one embodiment, the dispersing agent allows the nanocatalyst particles to operate at a higher temperature, which can have significant benefits. Higher operating temperatures can increase catalytic activity, thus reducing the amount of required catalyst. In some cases, proper catalytic activity can only be obtained at higher temperatures. Thus higher operating temperatures can provide opportunities for using new catalysts. Alternatively, the dispersing agent increases the length of time before the nanocatalyst particles are destroyed in combustion or pyrolysis. In this embodiment, the dispersing agent's ability to inhibit deactivation allows the nanocatalyst particles sufficient time to degrade undesirable small molecules before being consumed.

The tobacco compositions can be made into cigarettes, cigars or other forms of inhalable tobacco using methods known in the art. An organically complexed catalyst composition in a suspension can be sprayed or otherwise directly mixed with a tobacco material. Likewise, if the complexed nanocatalyst particles are supported on a support surface, the support material can be mixed with the tobacco. Tobacco compositions within the scope of the invention may further comprise one or more flavorants or other additives (e.g., burn additives, combustion modifying agents, coloring agents, binders, etc.) known in the art.

B. Coal Compositions

The catalyst compositions of the present invention can be combined with coal to make a modified coal composition having improved burn properties. In one embodiment, complexed nanocatalyst particles applied to or mixed with coal can assist in reducing the emission of $NO_x$ during combustion. The catalyst compositions can be combined with almost any type of coal material. Suitable coal materials include anthracite, bituminous, subbituminous, and lignite coals.

Any method can be used to apply the catalyst composition to the coal material. The catalyst composition can be directly mixed with the coal by spraying or using any other mixing technique. Complexed nanocatalyst nanoparticles in the form of a suspension are particularly easy to apply using a spraying technique.

The amount of catalyst applied to coal may be expressed in terms of weight percent of the metal catalyst (e.g., iron) by weight of the overall coal composition. Coal compositions typically include an iron loading of between about 0.1% and about 10% by weight of the overall coal composition. In a preferred embodiment, the metal (e.g., iron) loading is preferably less than about 5% by weight of the coal composition, more preferably less than about 2.5% by weight, and most preferably less than about 1.5% by weight.

The complexed nanocatalyst compositions of the invention have sufficient catalytic activity that catalyst loadings can be limited sufficiently to avoid problems with high iron concentrations. For example, high quantities of iron can present potential deposition problems in a boiler due to the fluxing abilities of the iron. The fly ash chemistry can also change with high iron loading. High iron loadings may also have an effect on corrosion of coal combustion equipment. By limiting the iron loading in the coal compositions of the present invention, the risks of these potential problems is reduced.

Coal compositions within the scope of the invention are designed to be used in combination with low NOx burners and over fire air ports. These technologies create a fuel-rich pyrolysis zone within a boiler that provides favorable conditions for the catalytic conversion of fuel nitrogen to harmless nitrogen gas. While not being limited to any particular theory, it is currently believed that the inventive organically complexed nanocatalyst compositions promote the increase of nitrogen release rates within high volatile eastern bituminous coal during the devolatization stage of a low NOx burner. This fuel-rich zone promotes the conversion of fuel nitrogen to nitrogen gas. Once converted to nitrogen gas, the nitrogen becomes more resistant to oxidation to form NOx. Therefore, when the pyrolyzed coal mixture passes into the combustion zone, nitrogen is much less likely to be converted to NOx compounds than the original coal compounds would be. This substantially reduces the overall generation of NOx during coal combustion.

Coal burners are typically designed to burn coal that has been pulverized. Those skilled in the art are readily familiar with coal burners, pulverizers, and related systems used to burn coal. According to one method of the present invention, a catalyst composition as described above is applied directly to the coal prior to pulverization. In this embodiment, applying the catalyst composition to the coal is very simple because the coal can be readily accessed. For example, the catalyst composition can be applied to coal on a conveyer. The nanocatalyst compositions may be applied to coal prior to combustion by "direct injection" or "mixing". In "direct injection", the catalyst is applied to the vertical coal stream located between the pulverizer and the burners. In "mixing", the catalyst is sprayed on the coal as it is conveyed prior to entering the pulverizer.

In an alternative embodiment, the catalyst composition is applied after the pulverizer but before the coal stream reaches the coal burner. Applying the catalyst composition to the coal stream can be somewhat more difficult after pulverization because there is more limited access to the pulverized coal.

In one embodiment, injectors are installed into the tubing of the coal feedstream and the catalyst composition is sprayed into the pulverized coal feed stream. Applying the catalyst composition directly into the pulverized feedstream can be advantageous because the catalyst composition can be better mixed initially since the coal has a small particle size.

In yet another embodiment, the catalyst composition and the pulverized coal material are injected individually into an oxygen depleted portion of a coal burner. In an exemplary embodiment, the catalyst material is sprayed into the burner with the coal material such that the catalyst nanoparticles and the pulverized coal material are sufficiently mixed such that the catalyst nanoparticles can catalyze the removal of coal nitrogen from the coal material within the oxygen depleted portion.

C. Other Fuel Compositions

The foregoing discussion of tobacco and coal compositions can be extended to other carbon-containing fuels such as briquetted charcoal, wood, biomass, and liquid hydrocarbons. Catalyst loadings in such fuels will typically be similar to those discussed above with respect to coal.

V. Examples of Fuel Compositions for Use in Reducing Pollutants During Combustion The following are various examples of inventive fuel compositions made using organically complexed nanocatalyst compositions according to the invention. Examples 1-11 describe the preparation of nanocatalyst compositions that can be used with a fuel substrate to improve burn properties (e.g., a tobacco material to reduce undesirable small molecules in tobacco smoke).

Example 1

Example 1 describes an iron catalyst prepared from an iron salt and activated at 500° C. 121.2 g of iron nitrate nonahydrate was dissolved in 187.5 g of water to form an iron solution. 32.57 g of 70% glycolic acid was diluted to 187.5 ml water and then mixed with the iron solution. A portion of the water was evaporated using a rotary evaporator under 200 mbar pressure at about 95° C. until the solution was about 65 ml. The iron solution was vacuum dried at 70° C. for 5 hours and then dried overnight in an oven at 80° C. The catalyst was further activated in air using the following heating procedure:

(1) heat from ambient temperature to 120° C. at 3° C. per minute,
(2) hold at 120° C. for 1 hour,
(3) raise temperature from 120° C. to 500° C. at 10° C. per minute,
(4) hold at 500° C. for 30 minutes.

The prepared and activated sample was cooled to ambient temperature.

Example 2

Example 2 describes an iron catalyst prepared from an iron salt and activated at 500° C. 10.1 g of iron nitrate nonahydrate was dissolved in 15.5 ml of water to form an iron solution. 4.80 g of citric acid was dissolved in 15.6 ml water and then mixed with the iron solution. A portion of the water was evaporated using a rotary evaporator under 200 mbar pressure at about 95° C. until a gel was formed. The iron solution was then vacuum dried at 70° C. for 5 hours. The catalyst was further activated in air using the same heating procedure as in Example 1. The prepared and activated sample was cooled to ambient temperature.

Example 3

Example 3 describes an iron catalyst prepared from an iron salt and activated in air at 80° C. 80 g of sodium hydroxide powder was dissolved in 1 liter of ethylene glycol while purging in nitrogen and heating to form Solution A. 120.0 g of iron nitrate nonahydrate was dissolved in 800 ml of ethyl glycol and mixed with Solution A while stirring and quickly adding 2000 ml of water. After 1 hour 500 ml of a 2.0 M $NH_4NO_3$ solution was added and an additional 1500 ml water. The solution was filtered to obtain a filter cake, which was washed three times with water. The filter cake was dried in a vacuum-oven overnight at 80° C. under about −28 inches of Hg.

Example 4

Example 4 describes an iron catalyst prepared from an iron powder and activated using an IR lamp. 0.56 g of iron powder and 1.92 g of citric acid were mixed with 100 ml of water in a 300 ml container and placed on a shaker until all the iron powder was dissolved. The solution was then heated on a rotary drier using an IR lamp until the sample became dry.

Example 5

Example 5 describes an iron catalyst prepared from an iron powder and activated in air at 80° C. 2.24 g of iron powder and 7.68 g of citric acid were mixed with 400 ml of water in a 1000 ml container and placed on a shaker until all the iron powder had dissolved. This procedure was repeated a second and a third time to obtain 3 aliquots of an iron solution. The three aliquots were mixed together and then dried on a rotary evaporator under 200 mbar at 80° C. The sample was then dried in a vacuum-oven for 3 hours at −28 inches of Hg and 80° C.

Example 6

Example 6 describes an iron catalyst prepared from an iron powder and activated in air at 300° C. 1.00 g of the catalyst prepared in Example 5 was further activated in air using the following heating procedure:

(1) heat from ambient temperature to 120° C. at 3° C. per minute,
(2) hold at 120° C. for 2 hour,
(3) raise temperature from 120° C. to 300° C. at 3° C. per minute,
(4) hold at 300° C. for 30 minutes.

Example 7

Example 7 describes an iron catalyst prepared from an iron powder and activated in air at 80° C. 2.24 g of iron powder and 7.68 g of citric acid were mixed with 400 ml water in a 1000 ml container and placed on a shaker until all the iron powder had dissolved. The iron solution was then dried on a rotary evaporator under 200 mbar at 80° C. The iron catalyst was then dried for 3 hours in a vacuum-oven under about −28 inches of Hg and at about 80° C.

Example 8

Example 8 describes an iron catalyst prepared from an iron powder and activated in air at 300° C. 2.00 g of the catalyst prepared in Example 7 was heat activated using the following heating procedure:

(1) heat from ambient temperature to 120° C. at 10° C. per minute,
(2) hold at 120° C. for 2 hour,
(3) raise the temperature from 120° C. to 300° C. at 3° C. per minute,
(4) hold at 300° C. for 30 minutes.

Example 9

Example 9 describes an iron catalyst prepared from an iron powder and activated in air at 360° C. 1.00 g of the catalyst prepared in Example 7 was heat activated using the following heating procedure:

(1) heat from ambient temperature to 120° C. at 10° C. per minute,
(2) hold at 120° C. for 2 hour,
(3) raise the temperature from 120° C. to 360° C. at 3° C. per minute,
(4) hold at 360° C. for 30 minutes.

Example 10

Example 10 describes an iron catalyst prepared from an iron powder and activated in nitrogen at 300° C. 1.00 g of the catalyst prepared in Example 7 was heat activated using the following heating procedure:

(1) heat from ambient temperature to 120° C. at 10° C. per minute,
(2) hold at 120° C. for 2 hour,
(3) raise the temperature from 120° C. to 300° C. at 3° C. per minute,
(4) hold at 300° C. for 30 minutes.

Example 11

Example 11 describes an iron catalyst prepared from an iron powder and activated using an IR lamp. 2.24 g of iron powder and 7.68 g of citric acid were mixed with 400 ml water in a 1000 ml container and placed on a shaker until all the iron powder was dissolved. The solution was dried on a rotary drier using an IR lamp.

CATALYST CHARACTERIZATION AND TESTING

The eleven catalysts described in Examples 1-11 were tested for CO oxidation activity. Catalyst screening tests were conducted in a tubular flow system. A 0.10 g catalyst sample was dusted onto quartz wool, which was then placed into a quartz flow tube and sandwiched with additional glass wool. The flow tube was then placed in a temperature-controlled tube furnace. The sample temperature was monitored by a K-type thermocouple inserted into the dusted quartz wool, and another thermocouple was placed in the middle of the furnace, outside the flow tube for monitoring the furnace temperature. Temperature data was recorded by computer.

Reactant gases were introduced as a pre-mixed gas feed containing carbon monoxide, oxygen, and helium as the carrier gas. Gas flow was controlled at 1.0 liter per minute by a digital mass flow controller. Samples of effluent gas were collected in a 125 ml cylinder every 2 minutes, and analyzed using a gas chromatograph (HP-6890).

Catalytic activity was determined by measuring the temperature at which 40% conversion was achieved. The results are shown below in Table 1.

The catalysts of Examples 1-11 were analyzed using X-ray diffraction and electron microscopy to determine particle size and crystal lattice spacing. The particle sizes and crystal lattice spacing are listed in Table 1 below. All the samples contained either $Fe_2O_3$, $Fe_3O_4$, or both. Crystal lattice spacing of approximately 0.30-0.31 corresponded to an $Fe_3O_4$ crystal lattice and a crystal lattice spacing of approximately 0.25-0.26 corresponded to a $Fe_2O_3$ crystal lattice. Example 4 had a significant amount of both $Fe_2O_3$ and $Fe_3O_4$ (60% and 40% respectively). Example 3 was almost entirely amorphous iron and carbon.

TABLE 1

| | Sample # | | | | | | | | | | |
|---|---|---|---|---|---|---|---|---|---|---|---|
| | 1 | 2 | 3 | 4 | 5 | 6 | 7 | 8 | 9 | 10 | 11 |
| Starting Material | $Fe(NO_3)_3$ | | | | Iron Powder | | | | | | |
| Activation Method | 500 air | 500 air | 80 air | IR lamp | 80 air | 300 air | 80 air | 300 air | 360 air | 300 $N_2$ | IR lamp |
| Crystallite Size [nm] | 45 | 50 | 3 | ~5- | 3-4 | 3-7 | 3-5 | 5-10 | ~5 | 5-10 | <5 |
| Lattice Plane Spacing [nm] | 0.250 | 0.256 | 0.257 | 0.310, 0.256 | 0.260 | 0.307 | 0.312 | 0.309 | 0.309 | 0.303 | 0.30 |
| Remaining Organic Phase | no | no | some | no | yes | some | yes | no | no | no | yes |
| 40% Conv. [° C.] | 480 | 340 | 275 | 320 | 405 | 265 | 405 | 300 | — | 320 | 360 |

Figure 2:
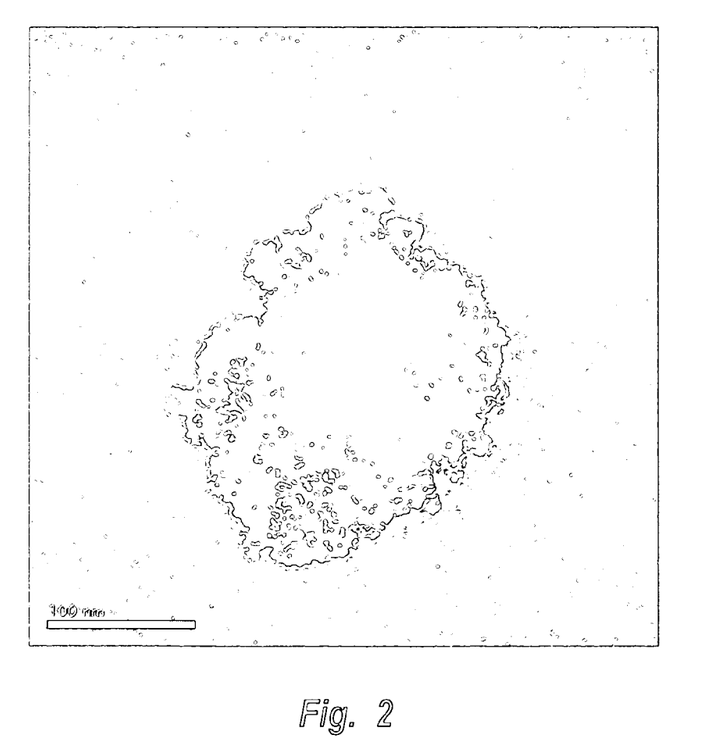
FIG. 2 is a TEM image of iron oxide nanoparticles manufactured according to another embodiment of the present invention.
Figure 3:
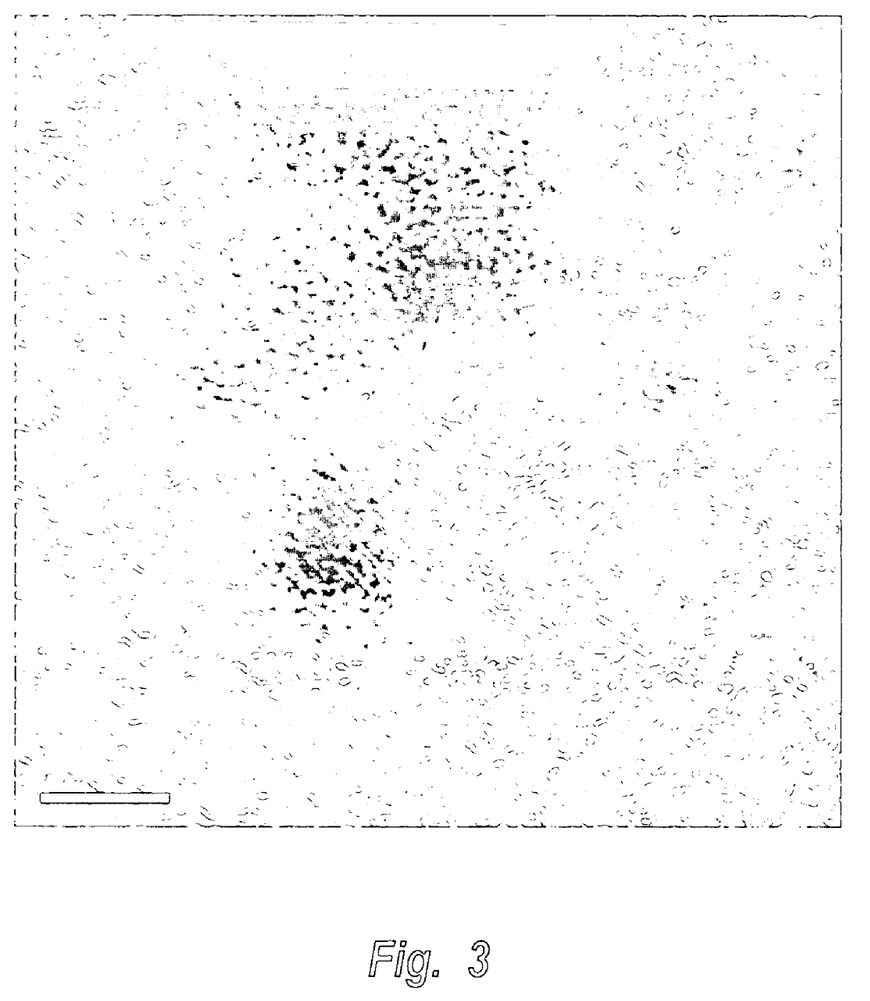
FIG. 3 is a TEM image showing a closer view of a portion of the iron oxide nanoparticles of FIG. 2.

The results in Table 1 indicate that the best performing catalysts have a $Fe_3O_4$ crystal lattice with a lattice spacing greater than 0.30 nm. Crystals made from iron powder were generally smaller. Crystals activated to 300° C. also had improved performance. The catalyst with the lowest temperature for 40% conversion of CO was Example 6. Notably the catalyst in Example 6 had some organic agent molecules remaining. TEM images of the catalyst particles manufactured in Example 6 are shown in FIGS. 2 and 3.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A catalyst composition suitable for application to a fuel substrate in order to modify the combustion properties thereof, comprising:
   a plurality of primary catalyst atoms comprising iron, the catalyst atoms forming a plurality of nanoparticles having a particle size of less than 1 micron;
   at least a portion of the catalyst atoms in the nanoparticles forming a crystal lattice having a plurality of crystal planes exposed at a surface thereof, wherein the spacing between the crystal planes is greater than about 0.28 nm; and
   a plurality of organic dispersing agent molecules bonded to at least a portion of the catalyst atoms of the nanoparticles, each dispersing agent molecule comprising one or more functional groups selected from the group consisting of a hydroxyl, a carboxyl, a carbonyl, an amine, an amide, a nitrile, a nitrogen having a free lone pair of electrons, an amino acid, an amine, a thiol, a sulfonic acid, a sulfonyl halide, and an acyl halide, wherein the dispersing agent molecules are bonded with the catalyst atoms through the one or more functional groups, wherein the catalyst composition has been heat activated by heating to a temperature greater than 150° C.

2. A catalyst composition as defined in claim 1, wherein the spacing between crystal planes is greater than about 0.30 nm.

3. A catalyst composition as defined in claim 1, wherein the spacing between crystal planes is greater than about 0.312 nm.

4. A catalyst composition as defined in claim 1, wherein the catalyst atoms are selected from the group consisting of manganese, iron, cobalt, nickel, copper, tin, zinc, tungsten, molybdenum, and combinations thereof 5. A catalyst composition as defined in claim 1, wherein the catalyst atoms comprise iron in an $Fe_3O_4$ (magnetite) crystal lattice.

6. A catalyst composition as defined in claim 1, the nanoparticles having a size less than about 300 nm.

7. A catalyst composition as defined in claim 1, the nanoparticles being dispersed in a solvent so as to form a nanocatalyst suspension.

8. A catalyst composition as defined in claim 7, the nanoparticle suspension having a nanoparticle concentration greater than about 1% by weight of the suspension.

9. A catalyst composition as defined in claim 7, the solvent comprising water.

10. A fuel composition having modified combustion properties, comprising:
    a fuel substrate comprising at least one member selected from the group consisting of tobacco, coal, briquetted charcoal, wood, biomass, fuel oil, diesel, jet fuel, gasoline, and liquid hydrocarbons;
    a plurality of catalyst nanoparticles on and/or mixed with said fuel substrate, said catalyst nanoparticles having a size less than 1 micron and being comprised of:
        a plurality of primary catalyst atoms comprising iron;
        at least a portion of the catalyst atoms forming a crystal lattice having a plurality of crystal planes exposed at a surface thereof, wherein the spacing between the crystal planes is greater than about 0.28 nm; and
        a plurality of organic dispersing agent molecules bonded to at least a portion of the catalyst atoms, each dispersing agent molecule comprising one or more functional groups selected from the group consisting of a hydroxyl, a carboxyl, a carbonyl, an amine, an amide, a nitrile, a nitrogen having a free lone pair of electrons, an amino acid, an amine, a thiol, a sulfonic acid, a sulfonyl halide, and an acyl halide, wherein the dispersing agent molecules are bonded with the catalyst atoms through the one or more functional groups,
    wherein the catalyst nanoparticles have been heat activated by heating to a temperature greater than 75° C.

11. A fuel composition as defined in claim 10, wherein the catalyst atoms comprise iron in an $Fe_3O_4$ (magnetite) crystal lattice.

12. A catalyst composition as defined in claim 10, wherein the spacing between crystal planes is greater than about 0.30 nm.

13. A fuel composition as defined in claim 10, the catalyst nanoparticles comprising less than about 2.5% by weight of the fuel composition.

14. A fuel composition as defined in claim 10, the dispersing agent molecules comprising at least one member selected from the group consisting of ethanol, propanol, formic acid, acetic acid, oxalic acid, malonic acid, ethylene glycol, polyethylene glycol, propylene glycol, polypropylene glycol, glycolic acid, glucose, citric acid, glycine, ethanolamine, mercaptoethanol, 2-mercaptoacetate, sulfobenzyl alcohol, suflobenzoic acid, sulfobenzyl thiol, and sulfobenzyl amine.

15. A catalyst composition as defined in claim 1, wherein the catalyst composition has been heat activated by heating to a temperature greater than about 250° C.

16. A fuel composition as defined in claim 10, wherein the catalyst composition has been heat activated by heating to a temperature greater than 150° C.

17. A fuel composition as defined in claim 10, wherein the catalyst composition has been heat activated by heating to a temperature greater than about 250° C.

18. A method of combusting a fuel composition having modified combustion properties, the method comprising:
    obtaining a fuel composition comprised of:
        a fuel substrate comprising at least one member selected from the group consisting of tobacco, coal, briquetted charcoal, wood, biomass, fuel oil, diesel, jet fuel, gasoline, and liquid hydrocarbons;
        a plurality of catalyst nanoparticles on and/or mixed with said fuel substrate, said catalyst nanoparticles having a size less than 1 micron and being comprised of:
            a plurality of primary catalyst atoms comprising iron;
            at least a portion of the catalyst atoms forming a crystal lattice having a plurality of crystal planes exposed at a surface thereof, wherein the spacing between the crystal planes is greater than about 0.28 nm; and
            a plurality of organic dispersing agent molecules bonded to at least a portion of the catalyst atoms, each dispersing agent molecule comprising one or more functional groups selected from the group consisting of a hydroxyl, a carboxyl, a carbonyl, an amine, an amide, a nitrile, a nitrogen having a free lone pair of electrons, an amino acid, an amine, a thiol, a sulfonic acid, a sulfonyl halide, and an acyl halide, wherein the dispersing agent molecules are bonded with the catalyst atoms through the one or more functional groups
        wherein the catalyst nanoparticles have been heat activated by heating to a temperature greater than 75° C.; and
    combusting the fuel composition in the presence of oxygen, the catalyst nanoparticles enhancing combustion efficiency of the fuel composition compared to combustion of the fuel substrate in the absence of the catalyst nanoparticles.

* * * * *

UNITED STATES PATENT AND TRADEMARK OFFICE
CERTIFICATE OF CORRECTION

PATENT NO. : 7,758,660 B2
APPLICATION NO. : 11/351661
DATED : July 20, 2010
INVENTOR(S) : Zhou et al.

It is certified that error appears in the above-identified patent and that said Letters Patent is hereby corrected as shown below:

Title Page
Item 56, References Cited, OTHER PUBLICATIONS, Page 2, change the reference "Ohtsuka, Yasuo, et al., "Char-Nitrogen Functionality and Interactions between the Nitrogen and Iron in the Iron-Catalyzed Conversion Process of Coal Nitrogen to $N_2$" Research Center for Organic Resources and Material s Chemistry, Institute for Chemical Reaction Science, Tohoku University, Sendai, Japan, pp. 1356-1362, (May 6, 1998)." to --Ohtsuka, Yasuo, et al., "Char-Nitrogen Functionality and Interactions between the Nitrogen and Iron in the Iron-Catalyzed Conversion Process of Coal Nitrogen to $N_2$" Research Center for Organic Resources and Materials Chemistry, Institute for Chemical Reaction Science, Tohoku University, Sendai, Japan, pp. 1356-1362, (May 6, 1998).--

Item 56, References Cited, OTHER PUBLICATIONS, Page 2, change the reference "Wang, H.P., et al., "Spectroscopic Studies of Coal Maceral Depolymerization Effected by an Iron-Based Catalystl" U.S. Department of Energy 1992, http://www-acerc.byu.edu/Abstracts/19. (1992)." to --Wang, H.P., et al., "Spectroscopic Studies of Coal Maceral Depolymerization Effected by an Iron-Based Catalyst" U.S. Department of Energy 1992, http://www-acerc.byu.edu/Abstracts/19. (1992).--

Column 3
Line 54, change "filly" to --fully--

Column 5
Line 22, change "agent" to --agents--

Column 7
Line 25, change "suflobenzoic acid" to --sulfobenzoic acid--

Column 11
Line 44, change "stabile" to --stable--

Column 13
Line 67, change "is" to --are--

Signed and Sealed this

Twenty-first Day of December, 2010

David J. Kappos
*Director of the United States Patent and Trademark Office*

CERTIFICATE OF CORRECTION (continued)
U.S. Pat. No. 7,758,660 B2

Column 14
Line 30, change "conveyer" to --conveyor--

Column 15
Line 17, before "water" insert --with--

Column 16
Line 25, change "2 hour" to --2 hours--
Line 50, change "2 hour" to --2 hours--
Line 64, change "2 hour" to --2 hours--

Column 17
Line 9, change "2 hour" to --2 hours--

Column 20
Line 14, change "suflobenzoic acid" to --sulfobenzoic acid--
Line 51, change "groups" to --groups,--